C. FOWLER.
DEFLECTOR.
APPLICATION FILED OCT. 6, 1919.
1,338,824.
Patented May 4, 1920.
2 SHEETS—SHEET 1.
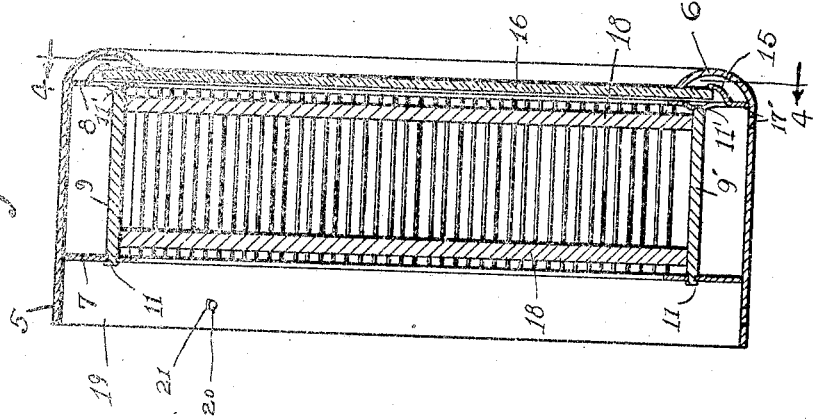
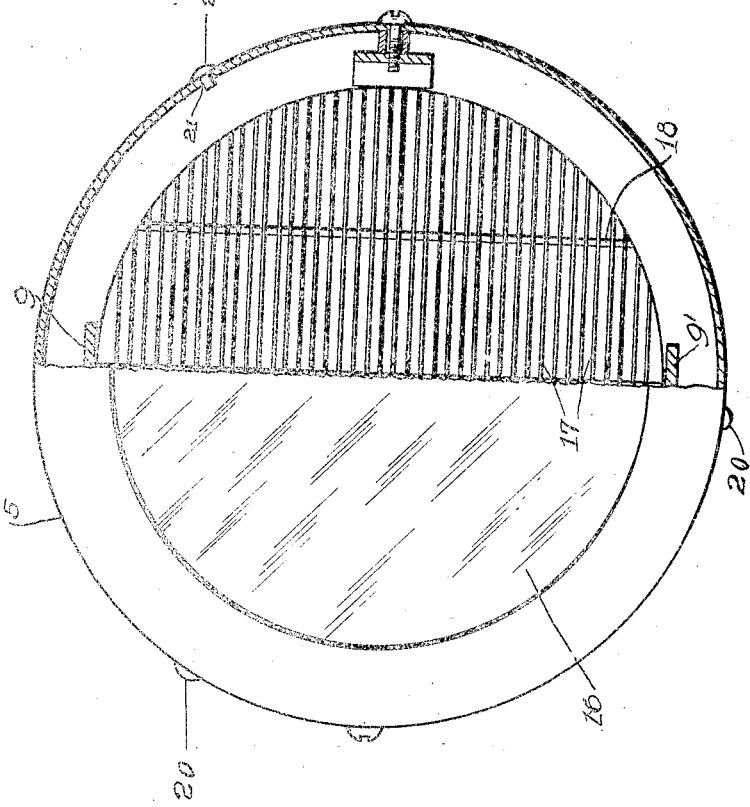
Witness
Inventor
Charles Fowler.
By
Attorneys C. FOWLER.
DEFLECTOR.
APPLICATION FILED OCT. 6, 1919.
1,338,824.
Patented May 4, 1920.
2 SHEETS—SHEET 2.
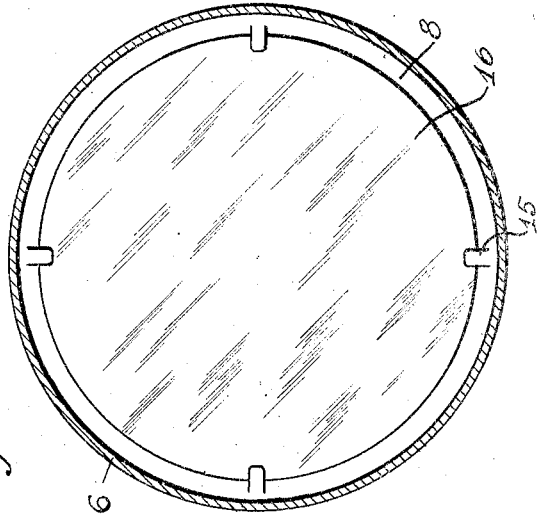
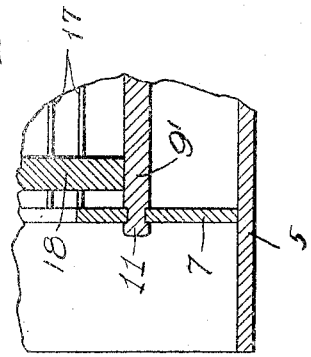
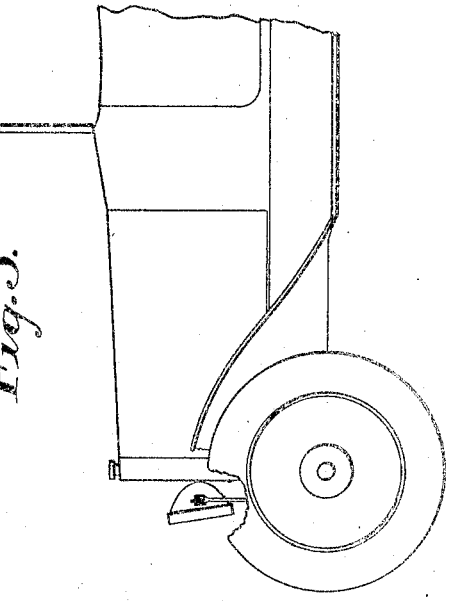
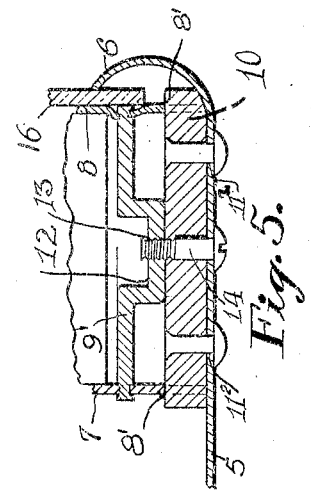
Inventor
Charles Fowler.

UNITED STATES PATENT OFFICE.

CHARLES FOWLER, OF WATSEKA, ILLINOIS.

DEFLECTOR.

1,338,824.  Specification of Letters Patent.  Patented May 4, 1920.

Application filed October 6, 1919. Serial No. 328,690.

*To all whom it may concern:*

Be it known that I, CHARLES FOWLER, a citizen of the United States, residing at Watseka, in the county of Iroquois and State of Illinois, have invented a new and useful Deflector, of which the following is a specification.

This invention has reference to automobile light construction, and more particularly, to a device adapted to be applied to the ordinary automobile lamp now in use, for deflecting the light rays thereof.

The primary object of the invention is to provide a device of this character which will restrict the diameter of the light rays of a lamp, and direct the same to a proper location in the path of travel of a vehicle to properly illuminate the road surface over which the vehicle is traveling, and at the same time eliminate the usual glare which ordinarily blinds the operator of an automobile approaching from the opposite direction.

A further object of the invention is to provide a device of this character including means to permit the same to be readily and easily applied to automobile lamps in common use, without the necessity of modifying the construction of the lamp to which the same is applied.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:—

Figure 1 illustrates a front elevational view of a deflector constructed in accordance with the present invention, the same being shown as partly broken away.

Fig. 2 is a longitudinal sectional view of the same.

Fig. 3 illustrates an angle at which the lamp operates.

Fig. 4 illustrates a sectional view taken on line 4—4 of Fig. 2.

Fig. 5 is a sectional view disclosing the securing blocks.

Fig. 6 is a fragmental detail view of the connection between the spacing bars and supporting rings.

Having reference to the drawings in detail, the reference character 5 designates the frame of the deflector, which as shown is relatively wide, and circular in formation, to conform to the contour of the ordinary automobile lamps now in use.

The frame 5 includes the circumferential flange 6, which is curved to lend resiliency thereto, in order that the same may provide means to support the lens within the frame, the flange 6 extending inwardly, a predetermined distance, the distance being regulated by the size and shape of the frame.

Within the frame 5, and constructed to fit the interior wall thereof, are the rings 7 and 8, the ring 8, being disposed adjacent the forward portion of the frame 5, while the ring 7, is disposed adjacent the rear of the frame, the rings being held in spaced relation by means of the spacing bars 9 and 9' each of which is provided with a head 11, passing through suitable openings in the ring 7, said heads providing a means for securing the spacing bars 9 and 9' to the ring 7, the opposite ends of the bars 9 and 9' being also provided with heads 11', passing through suitable openings formed in the ring 8, the heads being provided to rigidly connect the ring 8, and the spacing bars 9, at the forward portion of the frame.

Each of the rings 7 and 8, is provided with cut-out portions 8', the cut-out portions of the respective rings, being disposed in horizontal alinement with each other to receive the securing blocks 10, which are riveted to the frame 5, as at 11², whereby movement of the blocks 10 and rings 7 and 8, with relation to the frame 5 is absolutely prevented.

The spacing bars 9 and 9', which are disposed substantially centrally of the frame, are each provided with an offset portion 12, apertured as at 13 to receive the threaded end of the securing bolt 14, operating through registering openings provided within the securing block, frame 5 and spacing bar 9 or 9'. From the foregoing it will be seen that due to the length of the offset portion 12 of the spacing bar 9', the twisting, of the connecting bar with relation to the securing block 10 is prevented.

The ring 8, is provided with outwardly extending lugs 15 spaced throughout a portion of its circumference, and which as shown, engage the lens 16, at predetermined points, and hold the same against lateral displacement, the securing blocks 10, holding the lens 16 into engagement with the inwardly extending flange 6, to prevent movement of the lens, with relation to the frame.

Disposed within the frame, in spaced relation with each other, are horizontally supported deflector plates 17, extending the entire width of the frame, and which plates are connected by the vertically disposed rods 18, which rods 18 hold the plates 17, in suitable spaced relation with each other, against displacement. From the foregoing it is obvious that the ring 7 is supported in such spaced relation with the inner edge of the frame 5, as to provide the flange 19, which flange is constructed to embrace the outer periphery of a lamp of the usual type employed as head lights on automobiles, the rivets 20, passing through the openings 21 formed in the flange 19, adapted to engage behind the usual lens supporting flange of an automobile lamp.

Openings 17', are formed in the lower portion of the casing, or frame 5, which openings provide means for draining the frame, thereby permitting any water which may collect in the frame, to flow therefrom.

In operation, the frame of the device, is properly positioned on an automobile lamp, the lamp is then tilted until the front edges of the plates 17 are in the same plane with the rear edges of the lower adjacent plate, with the result that the light rays passing through the deflector is confined to a plane, directly in front of the machine, and no portion of the light rays may pass above the level of the upper edge of the lens, the arrangement of the deflector plates 17 being such as to confine the light rays to a zone, below the upper edge of the deflector plate, or below the normal plane of vision, of an advancing person.

It might be further stated that the deflector plates 17 are preferably coated, on their upper surfaces, with black paint, while the under surfaces thereof, are preferably coated with a bright reflecting coloring matter, in order that the light rays which usually are directed above the plane of the upper edge of the lamp, may be reflected downwardly reducing light absorption, to a minimum.

Having thus described the invention, what is claimed is:—

1. In combination with a lamp, a deflector including a frame, spaced ring members supported within the frame, spacing bars for supporting the rings in spaced relation, each of the ring members having cut-out portions, the cut-out portion of one ring member alining with the cut-out portion of the other ring, a securing block passing through the alining cut-out portions, means extending through the frame, securing blocks and spacing bars, for securing the spaced ring members in the frame, and deflector plates supported between the spaced ring members.

2. In combination with a lamp, a deflector including a frame, spaced ring members supported in the frame, an integral flange formed on the frame, means for holding the ring members in spaced relation with each other, one of the rings having lugs forming a part thereof, a lens supported by said lugs and engaging the flange for securing the lens against lateral displacement, deflector plates supported within the frame, and means for securing the deflector to the lamp.

3. In combination with a lamp, and the peripheral bead thereof, a deflector including a circular frame, said frame having a flange formed integral therewith spaced ring members supported within the frame, deflector plates supported in spaced relation with each other, between the ring members, means on one of the rings for engaging a lens, for holding the lens into engagement with the flange, and means extending through the frame, for securing the ring members within the frame, and means engaging the peripheral bead for securing the deflector to the lamp.

In testimony that I claim the foregoing as my own I have hereto affixed my signature in the presence of two witnesses.

CHARLES FOWLER.

Witnesses:
JAMES O. BAILEY,
STEPHEN C. MALO.